(12) United States Patent
Ma et al.

(10) Patent No.: US 11,188,750 B1
(45) Date of Patent: Nov. 30, 2021

(54) MULTI-FRAME MOVING OBJECT DETECTION SYSTEM

(71) Applicant: National Technology & Engineering Solutions of Sandia, LLC, Albuquerque, NM (US)

(72) Inventors: Tian J. Ma, Albuquerque, NM (US); Robert J. Anderson, Albuquerque, NM (US)

(73) Assignee: National Technology & Engineering Solutions of Sandia, LLC, Albuquerque, NM (US)

( * ) Notice: Subject to any disclaimer, the term of this patent is extended or adjusted under 35 U.S.C. 154(b) by 25 days.

(21) Appl. No.: 16/867,314

(22) Filed: May 5, 2020

(51) Int. Cl.
*G06K 9/00* (2006.01)
*G06K 9/62* (2006.01)
*G06K 9/40* (2006.01)

(52) U.S. Cl.
CPC ............ *G06K 9/0063* (2013.01); *G06K 9/40* (2013.01); *G06K 9/6298* (2013.01); *G06K 2009/00644* (2013.01); *G06K 2209/21* (2013.01)

(58) Field of Classification Search
CPC ...... G06K 9/0063; G06K 9/40; G06K 9/6298; G06K 2209/21; G06K 2209/00644
See application file for complete search history.

(56) References Cited

U.S. PATENT DOCUMENTS

| | | | |
|---|---|---|---|
| 10,032,285 B1 * | 7/2018 | Ma | ........................... G06T 7/277 |
| 2011/0205359 A1 * | 8/2011 | Lee | ........................... G06T 7/285 |
| | | | 348/143 |
| 2017/0178295 A1 * | 6/2017 | Diggins | ............. G06K 9/00758 |
| 2017/0249723 A1 * | 8/2017 | Karbeyaz | ................ G06T 5/002 |
| 2018/0232947 A1 * | 8/2018 | Nehmadi | .............. G01S 17/931 |

FOREIGN PATENT DOCUMENTS

| | | |
|---|---|---|
| JP | 4892965 B2 * | 3/2012 |
| WO | WO-2015168700 A1 * | 11/2015 ........... G01S 13/538 |

OTHER PUBLICATIONS

Reed, et al., "A Recursive Moving-Target-Indication Algorithm for Optical Image Sequences", In IEEE Transactions on Aerospace and Electronic Systems, vol. 26, No. 3, May 1990, pp. 434-440.

(Continued)

*Primary Examiner* — Matthew C Bella
*Assistant Examiner* — Kathleen M Broughton
(74) *Attorney, Agent, or Firm* — Medley, Behrens & Lewis, LLC; Samantha Updegraff

(57) ABSTRACT

A plurality of remote sensing images of a scene are received. A potential target object can be identified in one of the images, wherein the target object has a low signal-to-noise ratio (SNR). A candidate motion path of the target object can be generated based upon the images. A predicted position of the target object along the candidate motion path is determined for each of the remote sensing images. An image chip is extracted from each of the images, where each image chip is centered about the predicted position of the target object in its corresponding image. A sum image chip is generated based upon the image chips. An indication that the potential target object is an actual object in the images is output based upon a value of a center pixel of the sum image chip.

20 Claims, 7 Drawing Sheets

(56) References Cited

OTHER PUBLICATIONS

Blackman, S., "Multiple Hypothesis Tracking for Multiple Target Tracking", In IEEE A&E Systems Magazine, vol. 19, No. 1, Jan. 2004, pp. 5-18.
Simonson, et al., "Robust Real-Time Change Detection in High Jitter", Aug. 2009, Sandia Report, SAND2009-5546, Aug. 2009, pp. 1-41.
Tonissen, et al., "Performance of Dynamic Programming Techniques for Track-Before-Detect", In IEEE Transactions on Aerospace and Electronic Systems, vol. 32, No. 4, Oct. 1996, pp. 1440-1451.
Boers, et al., "Multitarget Particle Filter Track Before Detect Application", In IEE Proceedings—Radar, Sonar, Navigation, vol. 151, No. 6, Dec. 2004, pp. 351-357.
Fernandez, M., "Detecting and Tracking Low-Observable Targets Using IR", In Proceedings of SPIE Signal and Data Processing of Small Targets, vol. 1305, 1990, pp. 192-206.
Grossi, et al., "A Novel Dynamic Programming Algorithm for Track-Before-Detect in Radar Systems", In IEEE Transactions on Signal Processing, vol. 61, No. 10, May 15, 2013, pp. 2608-2619.
Wang, et al., "Refined PHD Filter for Multi-Target Tracking under Low Detection Probability" In Sensors, vol. 19, No. 13, Jun. 26, 2019, pp. 1-17.

\* cited by examiner

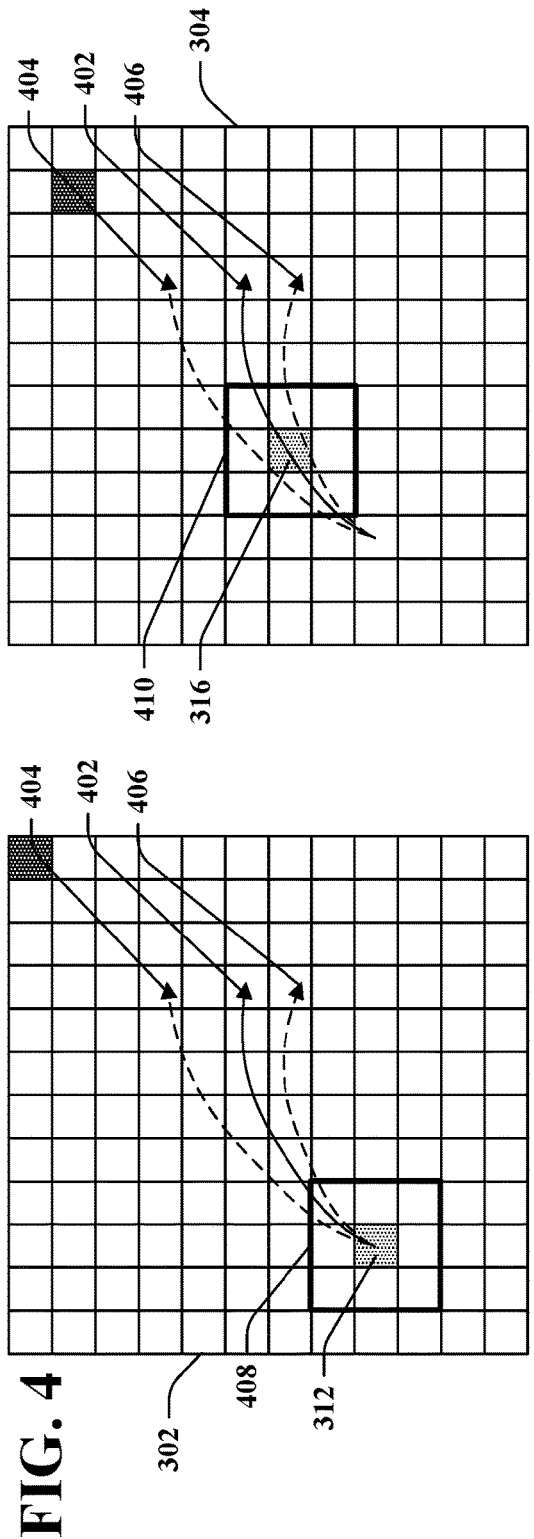
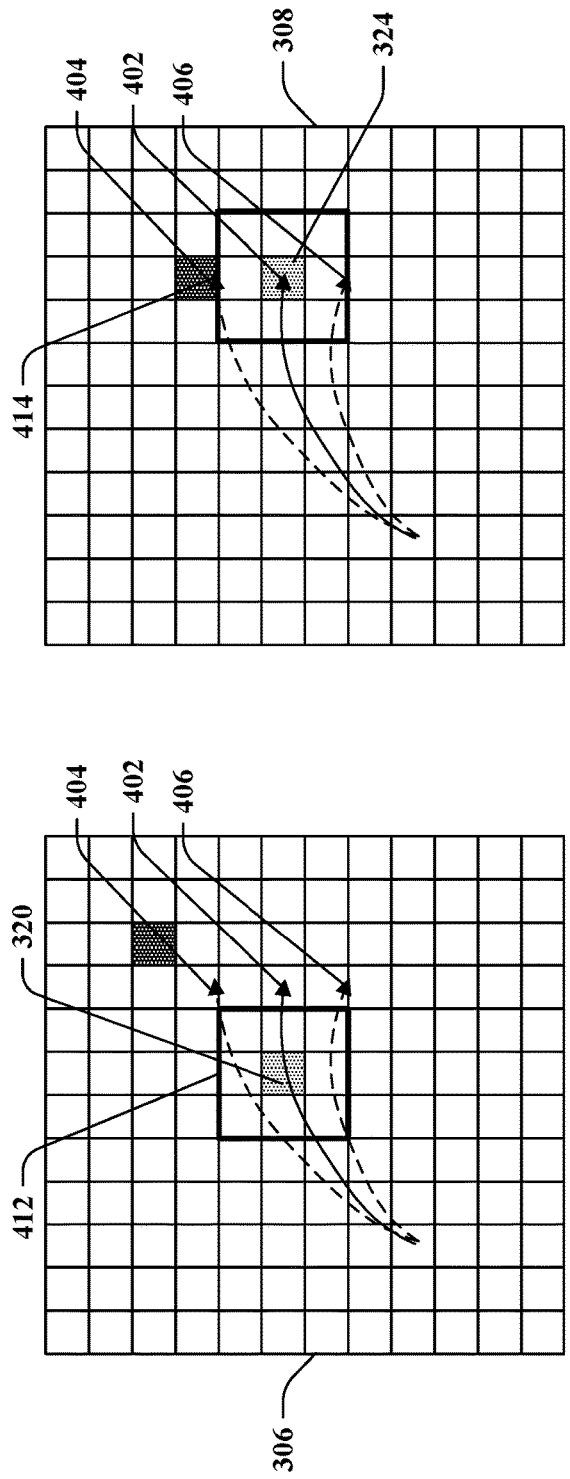
FIG. 4

MULTI-FRAME MOVING OBJECT DETECTION SYSTEM

STATEMENT OF GOVERNMENTAL INTEREST

This invention was made with Government support under Contract No. DE-NA0003525 awarded by the United States Department of Energy/National Nuclear Security Administration. The U.S. Government has certain rights in the invention.

BACKGROUND

Remote sensing systems are used for area surveillance, object tracking, and other purposes. These systems can include imaging systems mounted on satellites, aircraft, and other platforms. Remote sensing systems can generate images of large regions that can include thousands of objects that may be of interest to an image analyst. To facilitate analysis of objects of interest in remote sensing imagery, computing systems have been developed that are configured to identify moving objects in remote sensing images and to indicate positions of such objects to an analyst. These conventional image analysis systems are generally not robust to low signal-to-noise ratio (SNR) environments where it may be difficult to distinguish signals that are representative of real objects in a scene from noise that is present in images of the scene.

SUMMARY

The following is a brief summary of subject matter that is described in greater detail herein. This summary is not intended to be limiting as to the scope of the claims.

Various technologies pertaining to detection of objects represented in multiple frames of remote sensing image data are described herein. In an exemplary embodiment, a computing system receives a plurality of image frames that are each representative of a same scene. The image frames depict the scene and objects that are present in the scene, wherein one or more of such objects may be in motion. The computing system identifies a low SNR target pixel in a first image frame in the image frames, wherein the low SNR target pixel is potentially representative of an object in the scene. The computing system can identify the low SNR target pixel based upon the low SNR target pixel exceeding a threshold pixel value. The computing system identifies a candidate motion path for the object, wherein the candidate motion path is indicative of potential motion of the object through the scene over a period of time spanned by the image frames. The computing system can then determine whether the low SNR target pixel is actually representative of the object and whether the candidate motion path is indicative of actual motion of the object.

The computing system determines whether candidate motion path is indicative of motion of the object based upon image chips that are extracted from the image frames along the candidate motion path. The computing system computes a predicted position of an object represented by the low SNR target pixel for each of the image frames. The computing system extracts an image chip from each of the image frames, wherein each image chip is centered about the predicted position of the object in the image frame. Prior to extracting the image chips, the computing system can perform one or more filtering and normalization operations to mitigate the effects of background elements of the scene and noise in the image frames. The computing system can perform additional filtering and smoothing operations to the image chips, once extracted, in order to facilitate use of continuous, smooth candidate motion paths and to facilitate detection of locations of target objects in a scene with sub-pixel precision. The computing system generates a sum image chip based upon the extracted image chips. In an exemplary embodiment, the computing system generates the sum image chip by applying respective matched filters to each of the image chips, and then summing the image chips on an aligned basis. By way of example, and not limitation, the image chips can be summed on a pixel-wise basis such that top left pixels of each of the chips are added to generate a top left pixel value of the sum image chip, bottom right pixels of each of the chips are added to generate a bottom right pixel value of the sum image chip, etc. In another example, the image chips can be aligned and summed on a sub-pixel basis. In such example, the image chips can be represented by continuous pixel intensity functions, and the image chips can be summed in an aligned coordinate space over which the continuous pixel intensity functions are defined. In this example, the sum image chip can be represented by a continuous pixel intensity function that is the sum of the pixel intensity functions of the image chips.

The computing system determines whether the candidate motion path is indicative of motion of an object in the scene based upon a pixel value of a center pixel of the sum image chip. By way of example, and not limitation, the computing system can compute a z-score of the center pixel of the sum image chip, wherein the z-score is indicative of a deviation of the center pixel from a mean of the pixel values of the sum image chip. The computing system can determine that the candidate motion path is indicative of motion of an actual object in the scene based upon the z-score of the center pixel of the sum image chip exceeding a threshold value. When the image chips are centered about actual positions of an object in the scene, signal energy attributable to the object in each of the image frames (e.g., represented by pixel values of the image frames) will accumulate in the center pixel of the sum image chip. By contrast, signal energy resulting from random noise will be distributed in the sum image chip at random. The presence of an object can therefore be determined by the center pixel of the sum image chip having a value that is substantially different from the values of the other pixels of the sum image chip.

Responsive to determining that the candidate motion path is indicative of motion of an actual object in the scene, the computing system can output an indication of the candidate motion path to a display for review by an analyst. In an exemplary embodiment, the computing system displays a graphical representation of the candidate motion path overlaid on one or more of the image frames from which the candidate motion path was generated. The computing system can further output to an object motion tracker an indication of the low SNR target pixel to which the candidate motion path pertains. Subsequently, the computing system can execute the object motion tracker to track motion of the object in image frames of the scene that are subsequently received by the computing system. Thus, the computing system can be configured to identify and track objects The above summary presents a simplified summary in order to provide a basic understanding of some aspects of the systems and/or methods discussed herein. This summary is not an extensive overview of the systems and/or methods discussed herein. It is not intended to identify key/critical elements or to delineate the scope of such systems and/or methods. Its sole purpose is to present some concepts in a simplified form as a prelude to the more detailed description that is presented later.

BRIEF DESCRIPTION OF THE DRAWINGS

FIG. 4 is a conceptual diagram illustrating candidate motion paths for the plurality of image frames depicted in FIG. 3.

DETAILED DESCRIPTION

Figure 1:
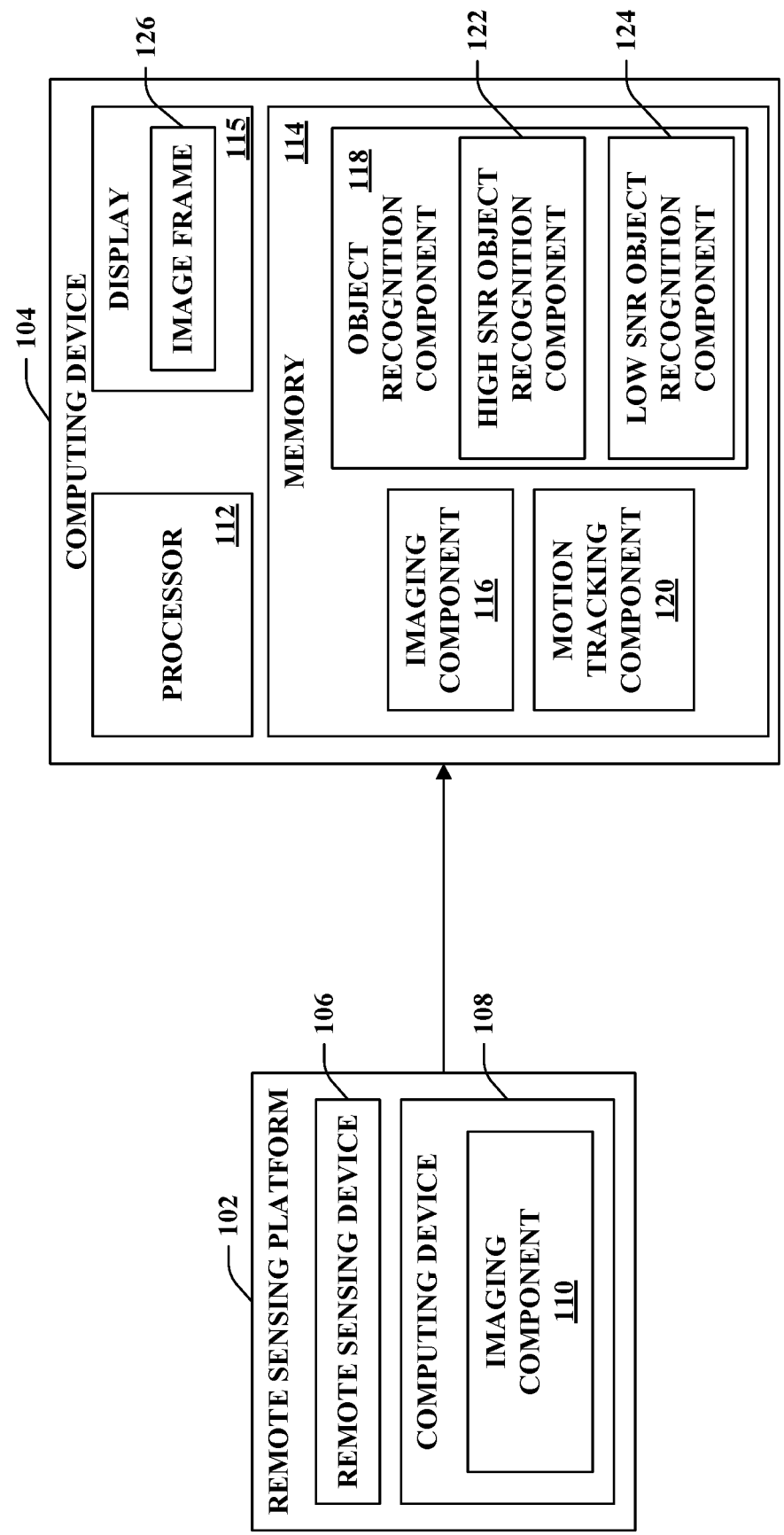
FIG. 1 is a functional block diagram of an exemplary system that facilitates identifying objects depicted in multi-frame image data.

Various technologies pertaining to detection of objects represented in multiple frames of remote sensing image data are described herein are now described with reference to the drawings, wherein like reference numerals are used to refer to like elements throughout. In the following description, for purposes of explanation, numerous specific details are set forth in order to provide a thorough understanding of one or more aspects. It may be evident, however, that such aspect(s) may be practiced without these specific details. In other instances, well-known structures and devices are shown in block diagram form in order to facilitate describing one or more aspects. Further, it is to be understood that functionality that is described as being carried out by certain system components may be performed by multiple components. Similarly, for instance, a component may be configured to perform functionality that is described as being carried out by multiple components.

Moreover, the term "or" is intended to mean an inclusive "or" rather than an exclusive "or." That is, unless specified otherwise, or clear from the context, the phrase "X employs A or B" is intended to mean any of the natural inclusive permutations. That is, the phrase "X employs A or B" is satisfied by any of the following instances: X employs A; X employs B; or X employs both A and B. In addition, the articles "a" and "an" as used in this application and the appended claims should generally be construed to mean "one or more" unless specified otherwise or clear from the context to be directed to a singular form.

Further, as used herein, the terms "component" and "system" are intended to encompass computer-readable data storage that is configured with computer-executable instructions that cause certain functionality to be performed when executed by a processor. The computer-executable instructions may include a routine, a function, or the like. It is also to be understood that a component or system may be localized on a single device or distributed across several devices. Additionally, as used herein, the term "exemplary" is intended to mean serving as an illustration or example of something and is not intended to indicate a preference.

With reference to FIG. 1, an exemplary system 100 that facilitates detection of objects represented in multiple frames of remote sensing image data is illustrated. The system 100 includes a remote sensing platform 102 and a computing device 104. The remote sensing platform 102 comprises a remote sensing device 106 and can further optionally include a computing device 108. The remote sensing device 106 can be a telescope, a camera, a radar imaging device (e.g., a synthetic aperture radar, SAR, imaging device), an electro-optical/infrared (EO/IR) imaging device, or any other imaging device that is capable of capturing images of a scene from a distance. The remote sensing device 106 can output images, radar returns, or other signals that are indicative of objects in scene. The computing device 108 includes an imaging component 110 that can be configured to receive signals from the remote sensing device 106 and to generate images of the scene based upon such signals. By way of example, and not limitation, the imaging component 110 can be configured to receive a radar return from a location in a scene and to assign a pixel value to a pixel in an image based upon the radar return, where the pixel is representative of the location in the scene.

The computing device 104 receives signals or images from the remote sensing platform 102. By way of example the computing device 104 can receive images generated by the imaging component 110 based upon radar signals received by the imaging component 110 from the remote sensing device 106. The computing device 104 includes a processor 112 and memory 114 that stores instructions that are executed by the processor 112. The computing device 104 further includes a display 115 on which can be displayed various data for presentment to an analyst user of the computing device 104. The processor 112 can be or include a CPU, a GPU or any combination thereof. Therefore, it is to be understood that the processor 112, while described in singular form herein, can be representative of a single processor or multiple processors of different types. By way of example the processor 112 can include a conventional CPU that executes some or all instructions described herein. Another example of the processor 112 can include a CPU that executes some functionality described herein and causes a GPU to execute other functionality described herein.

The memory 114 includes an imaging component 116, an object recognition component 118, and a motion tracking component 120. Briefly the imaging component 116 is configured to generate images of a scene based upon signals received from the remote sensing device 106. By way of example, the imaging component 116 can perform functionality describe with respect to the imaging component 110. In other words, the imaging component 116 can be configured to generate images of a scene based upon signals generated by the remote sensing device 106 wherein such signals are representative of objects and other elements that are present in the scene. The object recognition component 118 is configured to receive images from the imaging component 116 or the imaging component 110, and to identify objects that are present in the images. As will be described in greater detail below, the object recognition component 118 processes a plurality of image frames received from the imaging components 110, 116 and outputs indications of the locations of one or more objects in the images. The motion tracking component 120 is configured to receive indications of the presence of objects in images of the scene that are generated by the imaging components 110, 116, and to track such objects in future images received from the imaging components 110, 116.

The object recognition component 118 includes a high signal-to-noise ratio (SNR) object recognition component 122 and a low SNR object recognition component 124. The high SNR object recognition component 122 is configured to identify objects that have a high signal to noise ratio in the images. In an exemplary embodiment, the high SNR object recognition component 122 identifies objects in an image by applying a threshold to pixel values of the image. In the embodiment, pixels above the threshold value are identified as detected objects by the high SNR object recognition component 122.

The low SNR object recognition component 124 is configured to identify objects that have a low signal to noise ratio in the images. Briefly, the low SNR object recognition component 124 is configured to identify potential objects in a plurality of images based upon integrating a signal that is representative of an object in the scene across multiple image frames, as will be described in greater detail below. When energy associated with a target object in the images is integrated along a path of motion of the target through the scene, the energy associated with the object is added across the multiple frames. If the path of motion is a true path of the target object through the scene, the integrated energy provides a high signal value. Since noise in the images is generally random, however, the noise does not tend to be strongly additive along the path of the target object more so than along other paths through the scene. Accordingly, the integrated signal value associated with the target object will generally be higher than the integrated signal values of random noise. These aspects are described in greater detail below.

Figure 2:
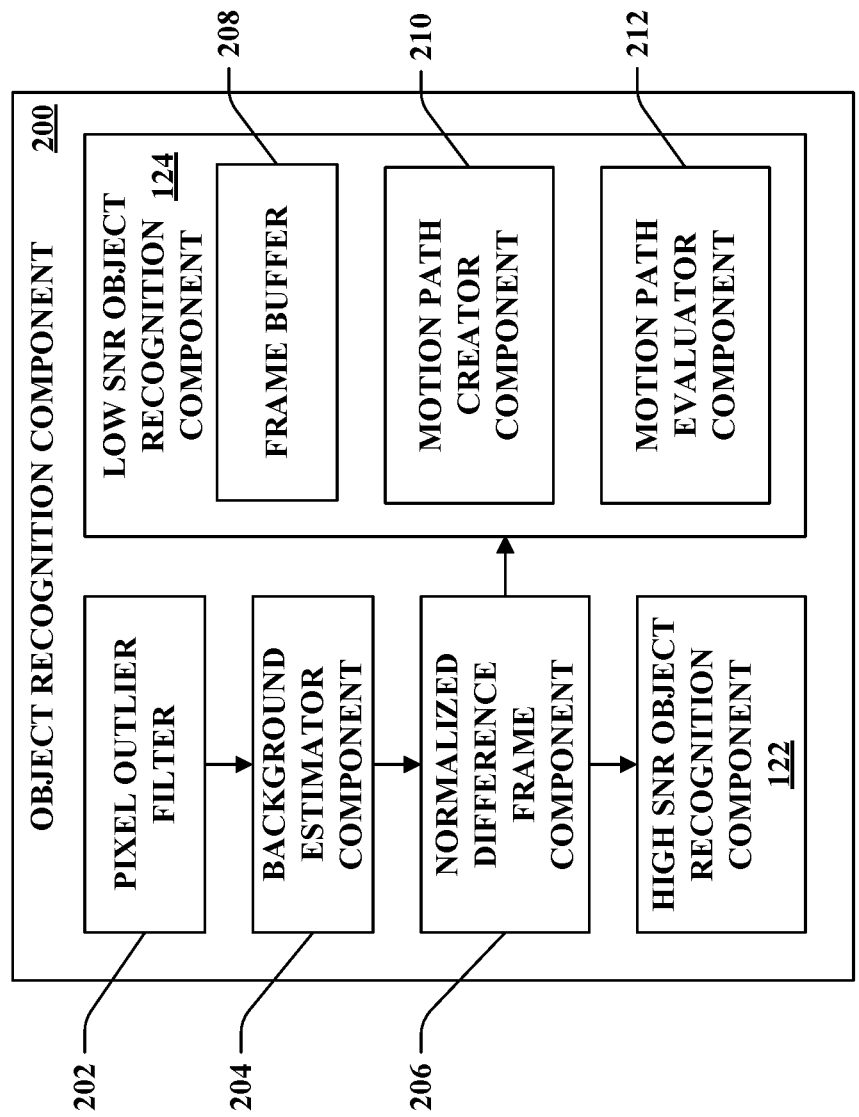
FIG. 2 is a functional block diagram of an exemplary object recognition component.

Referring now to FIG. 2, an exemplary embodiment 200 of the object recognition component 118 is illustrated. The object recognition component 200 includes the high SNR object recognition component 122, the low SNR object recognition component 124, a pixel outlier filter 202, a background estimator component 204, and a normalized difference frame component 206. The low SNR object recognition component 124 comprises a frame buffer 208, a motion path creator component 210, and a motion path evaluator component 212.

The object recognition component 200 receives a plurality of image frames from the imaging components 110, 116. Responsive to receipt of an image in the images the pixel outlier filter 202 filters extreme high and extreme low pixel values from the image. In an exemplary embodiment, the pixel outlier filter 202, for each pixel in a frame, identifies 8 neighboring pixels that surround the pixel in the frame. The pixel outlier filter 202 identifies at least one highest pixel value and at least one lowest pixel value among the values of the 8 neighboring pixels. The pixel outlier filter 202 discards the at least one highest pixel value and the at least one lowest pixel value from the neighboring pixel values, and then computes an outlier ratio of the pixel based upon the remaining neighboring pixel values. By way of example, and not limitation, for each of the pixels the pixel outlier filter 202 computes an outlier ratio according to the following equation:

$$\text{outlierRatio} = [F(i,j)] / [(A3+A4+A5+A6)+F(i,j)] \quad \text{Eq. 1}$$

where $F(i,j)$ is the value of the pixel in the ith row and jth column of an image frame, and where A3-A6 are pixel values of the middle-valued four of the 8 neighboring pixels (e.g., after the two highest pixel values and two lowest pixel values have been discarded).

The pixel outlier filter 202 applies a threshold to the computed outlier ratios. If the outlier ratio is greater than the threshold value the pixel is identified as an outlier by the pixel outlier filter 202. The pixel outlier filter 202 performs smoothing of outlier pixels. In an exemplary embodiment, the pixel outlier filter 202 replaces outlier pixels with the average value of its eight neighboring pixels according to the following equation:

$$F(i,j) = \frac{1}{8} \sum_{i=-1,j=-1}^{i+1,j+1} F(i,j) \quad \text{Eq. 2}$$

The pixel outlier filter 202 outputs frames having outlier pixels smoothed, which are referred to herein as "clean" frames.

The background estimator component 204 separates foreground and background elements of clean frames received from the pixel outlier filter 202. Stated differently, the background estimator component 204 is configured to identify pixels or pixel values of pixels that are representative of objects or elements in a scene depicted in an image frame that are substantially invariant over time. In a non-limiting example, the background estimator component 204 can be configured to identify pixels or pixel values that are representative of ground cover and vegetation in image frames. In another example, the background estimator component 204 can be configured to identify pixels or pixel values that are representative of substantially static bodies of water (e.g., lakes, rivers, oceans). In one exemplary embodiment, the background estimator component 204 computes background of an image frame based upon the infinite impulse response (IIR). The first order IIR background frame is a floating point array having a value for each pixel of a kth frame defined by the following equation:

$$\text{backgroundFrame}(k) = \alpha_1 * \text{backgroundFrame}(k-1) + (1-\alpha_1) * \text{rawFrame}(k) \quad \text{Eq. 3}$$

where rawFrame(k) is a kth image frame received by the background estimator component 204, backgroundFrame(k-1) is a background frame of a frame k-1 of the scene captured prior to rawFrame(k), $\alpha_1$ is a weight parameter between 0 and 1, and operations are performed on a pixel-by-pixel basis. Prior to any background frames being computed by the background estimator component 204, according to Eq. 3, a value of backgroundFrame(k-1) used to compute backgroundFrame(k) can be taken to be zero, or another default value. It is to be understood, however, that the background estimator component 204 can use any of various background detection methods or algorithms to identify background elements in an image frame. After identifying a pixel value that is representative of a background element (e.g., by computing pixel values of a background frame according to Eq. 3 above), the background estimator component 204 subtracts a pixel value of the background from the clean image frame received from the pixel outlier filter 204. In exemplary embodiments, the background estimator component 204 generates difference frames based upon the clean frames received from the pixel outlier filter 202 according to the following equation:

$$\text{Diff}(t) = F(t) - B(t-1) \quad \text{Eq. 4}$$

where Diff(t) is a difference frame representative of the scene at time t, F(t) is a clean frame representative of the scene at time t, and B(t-1) is a background frame representative of background elements in the scene at time (t-1) that is prior to time t.

The normalized difference frame component 206 receives a difference frame from the background estimator component 204 and outputs a normalized difference frame. The normalized difference frame component 206 normalizes pixel values of pixels of the difference frame with respect to the noise level of that frame. By way of example, and not limitation, the pixel value of a pixel at location (i,j) in a normalized difference frame at time t can be computed as:

$$\text{Norm Diff}(i, j, t) = \frac{\text{Diff}(i, j, t)}{\max(\sigma_{spatial}(i, j, t-1), \sigma_{temporal}(i, j, t-1))} \quad \text{Eq. 5}$$

where Norm Diff(i,j,t) is the pixel value of pixel (i,j) in the normalized difference frame at time t, Diff(i,j,t) is the pixel value of pixel (i,j) in a difference frame at time t (e.g., as received from the background estimator component 204), $\sigma_{spatial}(i,j,t-1)$ is the spatial standard deviation at pixel (i,j) from the difference frame immediately prior to the frame at time t, and $\sigma_{temporal}(i,j,t-1)$ is the temporal standard deviation at pixel (i,j) from the difference frame immediately prior to the frame at time t. The variance and temporal standard deviation can be calculated according to the following equations:

$$\text{variance}(t) = \alpha_2 * \text{variance}(t-1) + (1-\alpha_2) * \text{Diff}(t) * \text{Diff}(t) \quad \text{Eq. 6}$$

$$\sigma_{temporal}(t) = \sqrt{\text{variance}(t)} \quad \text{Eq. 7}$$

Parameter $\alpha_2$ is a weight parameter that takes a value between 0 and 1 and controls an update rate of the variance.

In an exemplary embodiment, the spatial variance $\sigma_{spatial}^2$ for each pixel i,j at time t can be estimated using a local window with size M×M, centered around pixel, i,j. An exemplary computation is expressed below:

$$\sigma_{spatial}^2(i, j, t) = \frac{1}{(2M+1)^2 - 1} \sum_{m-M}^{m+M} \sum_{n-M}^{n+M} |F(i+m, j+n, t) - \mu|^2 \quad \text{Eq. 8}$$

$$\mu = \frac{1}{(2M+1)^2} \sum_{i-m}^{i+m} \sum_{j-n}^{j+n} F(i+m, j+n, t) \quad \text{Eq. 9}$$

where M corresponds to the neighborhood window used to estimate the spatial variance and μ corresponds to the mean of the neighborhood window. The spatial standard deviation can then be defined as follows:

$$\sigma_{spatial}(i,j,t) = \sqrt{\sigma_{spatial}^2(i,j,t)} \quad \text{Eq. 10}$$

where $\hat{x}(i,j;t)$ is a predicted value of pixel (i,j) at time t based upon a frame at t−1 and a statistical model of variability of, and $E[\hat{x}(i,j;t)]$ is the expectation of the pixel (i,j) taking the value $\hat{x}(i,j;t)$ at time t.

The normalized difference frame component 206 outputs normalized difference frames to the high SNR object recognition component 122 and the low SNR objection recognition component 124. Pixel values of pixels in a normalized difference frame are indicative of an extent to which the pixels differ from the noise level in the frame. As normalized difference frames are received at the high SNR object recognition component 122, the high SNR object recognition component 122 identifies object candidates based upon a high SNR detection threshold value. The high SNR object recognition component 122 identifies a pixel of a normalized difference frame as being representative of an object in the scene represented by the frame if the pixel exceeds the high SNR detection threshold.

By contrast, the low SNR object recognition component 124 is configured to be able to identify pixels that have values below the high SNR detection threshold value as being representative of objects in the scene. In exemplary embodiments, the low SNR object recognition component 124 identifies a pixel of a normalized difference frame as being representative of an object in the scene by integrating pixel values along a candidate motion path that passes through the pixel and that is defined over a plurality of image frames.

Normalized difference frames are received from the normalized difference frame component 206 by the low SNR object recognition component 124 at a frame buffer 208. The frame buffer 208 receives and stores a plurality of normalized difference frames. The frame buffer 208 passes multiple normalized difference frames to the motion path creator component 210. In other exemplary embodiments of the object recognition component 118, the frame buffer 208 can pass image frames other than normalized difference frames to the motion path creator component 210. By way of example, the frame buffer 208 can be configured to receive images from either of the imaging component 110 or the imaging component 116, and to output such images to the motion path creator component 210.

The motion path creator component 210 is configured to generate candidate motion paths of potential target objects in image frames. As described in greater detail below, a candidate motion path generated by the motion path creator component 210 is evaluated by the motion path evaluator component 212 to determine whether the candidate motion path is representative of motion of a target object in the scene. A candidate motion path generated by the motion path creator component 210 can be represented as a plurality of points, each point comprising values of time, position, velocity, and acceleration.

The motion path creator component 210 receives image frames from the frame buffer 208. The motion path creator component 210 can be configured to identify a pixel that has a low SNR and that is potentially representative of a target object in the scene. Such pixels are referred to herein as low SNR target pixels. The motion path creator component 210 can identify such pixels based upon the high SNR threshold employed by the high SNR object recognition component 122 and a low SNR threshold value. In a non-limiting example, the motion path creator component 210 can identify a pixel as a low SNR target pixel based upon a value of the pixel being between the high SNR detection threshold and the low SNR detection threshold.

Figure 3:
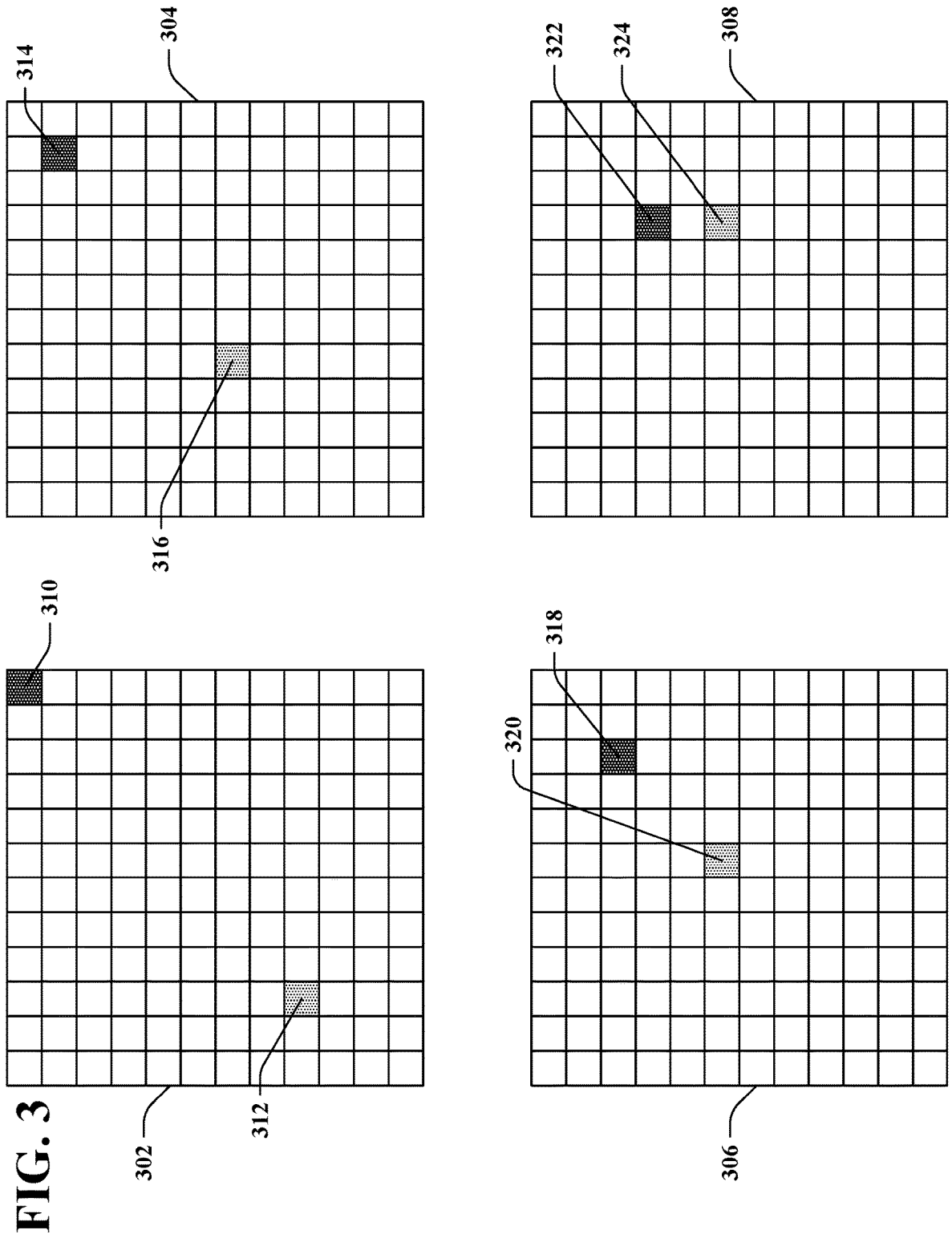
FIG. 3 is a diagram of a plurality of image frames.

By way of example, and with reference now to FIG. 3, a plurality of exemplary image frames 302-308 are illustrated. The image frames 302-308 are sequential image frames of a same scene each taken at a different time. The first image frame 302 includes a high SNR pixel 310 and a low SNR pixel 312. The second image frame 304 includes a high SNR pixel 314 that is representative of a same first object as the high SNR pixel 310 and a low SNR pixel 316 that is representative of a same second object as the low SNR pixel 312. Similarly, the third image frame 306 and the fourth image frame 308 include high SNR pixels 318, 322, respectively, that are representative of the first object, and low SNR pixels 320, 324 that are representative of the second object. In exemplary embodiments, the high SNR object recognition component 122 can identify the pixels 310, 314, 318, 322 as being representative of objects in the scene depicted in the image frames 302-308 based upon values of the pixels 310, 314, 318, 322 exceeding a high SNR detection threshold. In such embodiments, the motion path creator component 210 can identify the pixels 312, 316, 320, 324 as being potentially representative of target objects in the scene (i.e., as being low SNR target pixels) based upon values of the pixels 312, 316, 320, 324 exceeding a low SNR detection threshold but not exceeding the high SNR detection threshold.

The motion path creator component 210 can generate a candidate motion path by connecting low SNR pixels identified as being potentially representative of objects across multiple image frames received from the frame buffer 208. Stated differently, the motion path creator component 210 identifies a sequence of pixel locations across multiple image frames that are identified as potential low SNR target objects and assigns the sequence of pixel locations to a candidate motion path. For example, and with reference now to FIG. 4, a candidate motion path 402 is shown overlaid on each of the image frames 302-308. The candidate motion path 402 is generated such that the path 402 passes through each of the low SNR pixels 312, 316, 320, 324 in sequential order. In an exemplary embodiment, the motion path creator component 210 can generate the candidate motion path 402 by performing curve fitting to find a curve that minimizes an error between the curve and the locations of the low SNR pixels 312, 316, 320, 324 (e.g., a root-mean-square error).

In general, it is not known a priori which of a plurality of low SNR target pixels (e.g., pixels 312, 316, 320, 324) are actually representative of objects in a scene as opposed to random noise. Furthermore, in large images of populated areas, image frames can include hundreds or even thousands of low-SNR pixels that are representative of objects, and hundreds or thousands more pixels that exceed a low SNR detection threshold but the values of which are actually primarily caused by random noise. Therefore, in various embodiments, the motion path creator component 210 is configured to generate a plurality of candidate motion paths starting at each low SNR target pixel identified in a first frame in a sequence of frames that are received from the frame buffer 208. For example, and referring once again to FIG. 4, the motion path creator component 210 can generate the motion path 402 and can further generate additional candidate motion paths 404, 406 that start at the first low SNR target pixel 312. The motion path creator component 210 can generate the motion paths 402-406 based upon assumed values (rather than computed values) of position, velocity, and acceleration of an object represented by the low SNR target pixel 312. By way of example, the motion path creator component 210 can generate the first motion path 402 based upon a first set of values of position, velocity, and acceleration, can generate the second motion path 404 based upon a second set of values of position, velocity, and acceleration, and can generate the third motion path 406 based upon a third set of values of position, velocity, and acceleration.

In further embodiments, the motion path creator component 210 can be configured to generate candidate motion paths of potential target objects in image frames based upon user input (e.g., received by the computing device 104). By way of example, a user can set forth input to the computing device 104 that is indicative of a start location and an end location in a first image of a scene and a second image of the scene, respectively. The motion path creator component 210, responsive to receipt of a plurality of image frames of the scene that include the first image and the second image from the frame buffer 208, can generate a candidate motion path of a target object in the scene based upon the start location and the end location. For example, the motion path creator component 210 can generate the candidate motion path such that the candidate motion path passes through the start location in the first image and passes through the end location in the second image.

In still further embodiments, the motion path creator component 210 can be configured to generate candidate motion paths of potential target objects based upon output of the motion tracking component 120. By way of example, and not limitation, the motion tracking component 120 can be or include a Kalman filter tracker. The motion tracking component 120 can use a Kalman filter to track an object that is modeled by the following state vectors x:

$$x = \begin{bmatrix} r \\ \dot{r} \\ \ddot{r} \\ c \\ \dot{c} \\ \ddot{c} \end{bmatrix}$$ Eq. 11 where r, $\dot{r}$, and $\ddot{r}$, are respectively the position, velocity, and acceleration of the object in image row coordinates, and c, $\dot{c}$, and $\ddot{c}$ are the position, velocity, and acceleration of the object, respectively, in image column coordinates. Once a low SNR target pixel is initially identified in an image frame by the motion path creator component 210, the motion tracking component 120 can track an object represented by that pixel through subsequent image frames. In an exemplary embodiment, the motion tracking component 120 can predict a future state x of the object according to the following equation:

$$\hat{x}(k+1|k) = \Phi(\hat{x}(k|k))$$ Eq. 12 where $\Phi$ is an object motion state transition matrix, $\hat{x}(k|k)$ is the state of the object at time step k, and $\hat{x}(k+1|k)$ is a prediction of future state of the object at time step k+1 based on the state of the object at time step k. By way of example, the motion tracking component 120 can identify a state vector x for the low SNR target pixel according to Eq. 11. The motion tracking component 120 can generate and update the motion state transition matrix $\Phi$ based upon image frames as they are received by the motion tracking component 120 (e.g., from the imaging component 110 or the imaging component 116). The motion path creator component 210 can then generate a motion path that extends from the position of the object indicated by state vector $\hat{x}(k|k)$ to the position of the object indicated by state vector $\hat{x}(k+1|k)$. In exemplary embodiments, the motion path creator component 210 can initialize the state vector $\hat{x}(k|k)$ to have the position coordinates r and c of the low SNR target pixel from which the candidate motion path begins, and preset velocity and acceleration values $\dot{r}$, $\ddot{r}$, $\dot{c}$, and $\ddot{c}$.

In various embodiments, the motion path creator component 210 can be configured to generate a candidate motion path based on one or more constraints pertaining to motion of target objects. In a non-limiting example, the motion path creator component 210 can generate a candidate motion path subject to the constraint that an acceleration of an object depicted in the image frames 302-308 is constant. In further examples, the motion path creator component 210 can generate a candidate motion path subject to the constraint that a velocity of an object depicted in the image frames 302-308 does not exceed a maximum threshold value. Such constraints can simplify computations that are performed by the motion path creator component 210 and can prevent the motion path creator component 210 from generating candidate motion paths that are not likely to be representative of motion of actual objects in the scene.

The motion path creator component 210 can be configured to generate candidate motion paths of potential target objects in image frames by parallel processing of a plurality of candidate motion paths simultaneously. By way of example, the motion path creator component 210 can cause a plurality of processing cores of a GPU (e.g., included in or embodied by the processor 112) to each generate a respective candidate motion path. The motion path creator component 210 can therefore be configured to, in parallel, generate a plurality of candidate motion paths for a single low SNR target pixel. Furthermore, the motion path creator component 210 can, in a parallel fashion, generate candidate motion paths for a single low SNR target pixel according to multiple different candidate motion path generation approaches.

It is further to be understood that while the motion path creator component 210 generates candidate motion paths based upon pixel locations in image frames, the motion path creator component 210 can be configured to generate a candidate motion path that is defined to sub-pixel precision. In an exemplary embodiment, a candidate motion path can be a curve that is defined over an x-y coordinate system that is itself continuously defined over image frames received by the motion path creator component 210 from the frame buffer 208. In the embodiment, pixels in image frames can be represented by a range of x- and y-coordinates in the x-y coordinate system. In other words, a plurality of points in the x-y coordinate system of a candidate motion path may lie within a same pixel of an image frame.

Referring once again to FIG. 2, the motion path evaluator component 212 receives a candidate motion path generated by the motion path creator component 210 and evaluates the path to determine whether the path is representative of motion of an object in a scene. Responsive to determining that a candidate motion path is representative of motion of an object in a scene depicted in a plurality of image frames, the motion path evaluator component 212 can output an indication of the motion path or a low SNR target pixel to which the motion path pertains to a user of the computing device 104. By way of example, the motion path evaluator component 212 can cause a candidate motion path and/or a low SNR target pixel corresponding to the candidate motion path to be displayed on an image frame 126 on the display 115.

The motion path evaluator component 212 determines whether a candidate motion path is representative of motion of an object in a scene by integrating signal energy (e.g., as indicated by pixel values of pixels of image frames) along the candidate motion path. Whereas signal energy (e.g., light, radar returns, or other energy received from a scene by the remote sensing device 106) of an object represented by a pixel value may be low relative to a level of noise in an image frame, the signal energy of a true object in a scene is not random, unlike noise. Thus, signal energy of a true object in the scene is more strongly additive along a path of motion of the object than is noise along the path. Accordingly, when signal energy for an object in the scene is added along the path of the object across multiple image frames, the object can be distinguished from noise, which noise may have values that are high relative to the signal attributable to the object in only a single frame.

In exemplary embodiments, the motion path evaluator component 212 evaluates whether a candidate motion path is representative of motion of an object in a scene based upon a sum image chip that is based on a plurality of image frames of the scene. The motion path evaluator component 212 generates a sum image chip for a candidate motion path by summing image chips that are drawn from the image frames and that are each centered about a different pixel that lies along the candidate motion path. The motion path evaluator 212 draws an image chip from each of the image frames. The image chip of an image frame is centered about a pixel that is a predicted position, at a time corresponding to the image frame, of an object represented by the low SNR target pixel from which the candidate motion path begins. In exemplary embodiments, the predicted position can be based upon output of the motion tracking component 120. In other embodiments, the predicted position can be based upon iteratively refined assumptions about the motion of an object represented by the low SNR target pixel (e.g., velocity and acceleration of the object) employed by the motion path creator component 210.

By way of example, and with reference once again to FIG. 4, a plurality of image chips 408-414 are shown, overlaid on the image frames 302-308. The first image chip 408 is drawn from the first image frame 302 and is centered about the low SNR target pixel 312. The second image chip 410 is drawn from the second image frame 304 and is also centered about a pixel on the candidate motion path 402. Similarly, the third image chip 412 is drawn from the third image frame 306, and the fourth image chip 414 is drawn from the fourth image frame 308, and both image chips 412, 414 are centered about respective pixels that lie on the candidate motion path 402. In the exemplary image frames 302-308 depicted in FIG. 4, the image chips 408-414 are each centered about a low SNR target pixel. However, it is to be understood that a center pixel of an image chip need not be identified as a low SNR target pixel by the motion path creator component 210.

Figure 5:
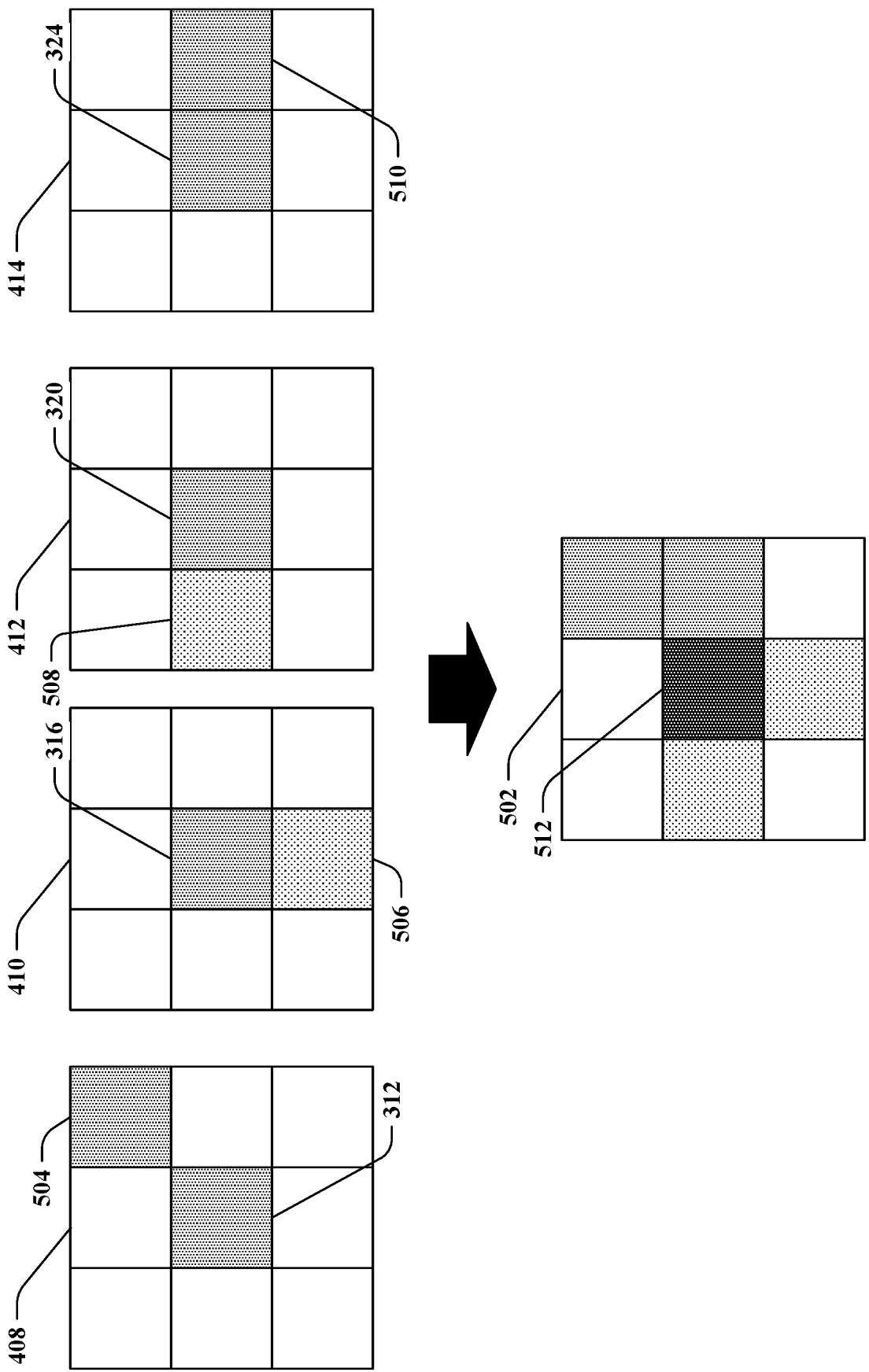
FIG. 5 is a diagram that illustrates a plurality of image chips and a resultant sum image chip.

The motion path evaluator component 212 can add the image chips 408-414 on a pixel-by-pixel basis to generate a sum image chip. The image chips 408-414 are aligned such that pixels at a same pixel location in each of the chips 408-414 are added to one another to generate a value of the pixel at that same pixel location in the sum image chip. By way of example, and referring now to FIG. 5, a sum image chip 502 is shown, wherein the sum image chip 502 is generated based upon the image chips 408-414. The image chips 408-414 include the low SNR target pixels 312, 316, 320, 324. As shown in FIG. 5, the image chips 408-414 can also include pixels 504-510 the values of which are due to random noise. The first image chip 408 includes noise pixel 504, the second image chip includes noise pixel 506, the third image chip 412 includes noise pixel 508, and the fourth image chip 414 includes noise pixel 510.

If a candidate motion path generated by the motion path creator component 210 is accurately representative of motion of an object in the image frames 302-306, signal energy attributable to the object should be concentrated in center pixels of the image chips 408-414. Accordingly, when the image chips 408-414 are summed to generate a sum image chip 502, signal energy attributable to the object from each of the image chips 408-414 should be added together in a center pixel 512 of the sum image chip 502. By contrast, noise present in the image chips 408-414 is random and so does not accumulate in pixels at the same rate as the signal energy of the object. Thus, when the image chips 408-414 are drawn from a true motion path of an object in the scene, the center pixel 512 of the sum image chip 502 has a value that is substantially greater than other pixels in the sum image chip 502. Accordingly, even if a noise pixel (e.g., noise pixel 504) in an image frame has a pixel value that is substantially similar to a pixel in the same frame that is actually representative of an object in the scene (e.g., the low SNR target pixel 312), the pixel that is actually representative of an object in the scene can be distinguished from the noise pixel based upon the sum image chip.

The motion path evaluator component 212 can determine whether a candidate motion path is representative of motion of an object based upon a z-score that is computed based upon the sum image chip. In an exemplary embodiment, the motion path evaluator component 212 constructs the sum image chip and computes its z-score as follows.

The motion path evaluator component 212 constructs a matched filter H for each image chip drawn from the image frames received from the frame buffer 208. For example, the motion patch evaluator component 212 constructs a different matched filter for each of the image chips 408-414. Objects that are depicted in remote sensing imagery commonly have extents that exceed a single pixel. This may be because an object physically maps to an area larger than an area represented by a single pixel, or because an objective lens spreads the energy of a point source spatially to neighboring pixels according to its point spread function. Since energy of a target object is generally spread across multiple pixels, a subpixel location of a target object can be determined to a sub-pixel precision.

For instance, if a hypothetical target is represented by a 2-D gaussian (normal) continuous intensity distribution function:

$$I(x,y) = I_0 e^{-((x-x_0)^2 + (y-y_0)^2)/(2\sigma_T^2)} \qquad \text{Eq. 13}$$

where $I_0$ is the maximum intensity, x and y are horizontal and vertical axes continuous values, the point $(x_0, y_0)$ is the center of the distribution, and $\sigma_T$ is the spatial standard deviation of the target. When this intensity energy is measured with a focal plane array, the energy falling within a single pixel "bin" is gathered and generates a single pixel intensity measurement according to:

$$I(i,j) = \int\int_{x=i,y=j}^{x=i+1,y=j+1} I_0 e^{-\frac{(x-x_0)^2 + (y-y_0)^2}{2\sigma^2}} dxdy \qquad \text{Eq. 14}$$

where I(i,j) is the discrete intensity function at the given pixel location (i,j). Eq. 14 can be approximated by sampling the intensity distribution function at the center of each pixel:

$$I(i,j) = I_0 e^{-((i+0.5-x_0)^2 + (j+0.5-y_0)^2)/(2\sigma_T^2)} \qquad \text{Eq. 15}$$

If the center $(x_0, y_0)$ of a hypothetical target in an image is near the center of a pixel in a single frame, then the discrete energy function of Eq. 15 has its maximum in the center of the pixel. However, if the center of the target is near an edge of a pixel, then one or more neighboring pixels of that pixel will have similar or nearly equal intensities. In order to collect energy from multiple frames in the center pixel of a summed image chip, an image chip can be shifted by a fractional pixel distance to correct for sub-pixel offsets of targets from a center of a pixel. A gaussian blur can further be applied to smooth the image chips, spreading target energy into neighboring pixels. By way of example, the matched filter H can be defined as:

$$H(i,j) = \left(\frac{1}{2\pi\sigma_H^2}\right) e^{-((i+0.5-\Delta x_0)^2 + (j+0.5-\Delta y_0)^2)/(2\sigma_H^2)} \qquad \text{Eq. 16}$$

where $\sigma_H$ is the standard deviation of the matched filter H, and $\Delta x_0, \Delta y_0$ are sub-pixel offsets in the x and y directions, respectively. As referenced above, the candidate motion paths created by the motion path creator component 210 can be defined at a sub-pixel level in terms of x and y coordinates. Accordingly, the center $(x_0, y_0)$ pixel of a hypothetical target in an image frame can be a position of a target object along the candidate motion path at a time t corresponding to that image frame.

In various embodiments, the filter H can be truncated to a finite size and normalized so that values of the filter sum to 1. By way of example, and not limitation, a 5×5 Gaussian blur filter of a smoothing $\sigma_H = 0.7$ with no sub-pixel shifting would be defined by:

$$H[u,v] = \begin{bmatrix} 0.000 & 0.002 & 0.005 & 0.002 & 0.000 \\ 0.002 & 0.042 & 0.117 & 0.042 & 0.002 \\ 0.005 & 0.117 & 0.325 & 0.117 & 0.005 \\ 0.002 & 0.042 & 0.117 & 0.042 & 0.002 \\ 0.000 & 0.002 & 0.005 & 0.002 & 0.000 \end{bmatrix}$$

In another non-limiting example, a 5×5 Gaussian blur filter of smoothing $\sigma_H = 0.7$ and a sub-pixel offset of $\Delta x = 0.2$, $\Delta y = 0.5$ can be defined by:

$$H[u,v] = \begin{bmatrix} 0.000 & 0.000 & 0.001 & 0.000 & 0.000 \\ 0.000 & 0.008 & 0.031 & 0.017 & 0.001 \\ 0.002 & 0.058 & 0.242 & 0.131 & 0.009 \\ 0.002 & 0.058 & 0.242 & 0.131 & 0.009 \\ 0.000 & 0.008 & 0.031 & 0.017 & 0.001 \end{bmatrix}$$

The smoothing standard deviation, $\sigma_H$, tends to dampen the peak energy in an image frame, but also dampens noise. If the value of the smoothing filtering is less than about half of the standard deviation $\sigma_T$ of the target energy intensity from the mean pixel value of an image chip, the amount of damping of the smoothed output signal peak will be small relative to damping of the noise.

The motion path evaluator component 212 constructs the matched filter for an image chip based upon an object state vector x for the low SNR target pixel to which the candidate motion path pertains. The object state vector used to compute each matched filter can differ based upon the changing prediction of object state along the candidate motion path employed by the motion path creator component 210 for each image frame.

Once the matched filter for each image frame is computed, the motion path evaluator component 212 applies the matched filter of an image frame to the image chip that is drawn from that image frame by convolution of the matched filter H with the image chip, according to the following equation:

$$\hat{C}[i,j] = \sum_{u=-(K-1)}^{(K-1)/2} \sum_{v=-(K-1)}^{(K-1)/2} H(u,v) C(i-u, j-v) \qquad \text{Eq. 17}$$

where C(i,j) is the value of the pixel of image chip C at pixel location (i,j), $\hat{C}$ is the matched-filtered image chip, H(u,v) is the matched filter applied to the image chip C, and K is the number of pixels in the image chip C.

The motion path evaluator component 212 can compute the sum image chip on a pixel-wise basis, or a sub-pixel basis using continuous intensity distributions, according to the following equation:

$$\hat{C}_{SUM} = \hat{C}(t) + \hat{C}(t-1) + \hat{C}(t-2) + \ldots \hat{C}(t-M) \qquad \text{Eq. 18}$$

where t is the time of the latest image frame in the sequence of image frames over which the candidate motion path is evaluated and M+1 is the number of image frames or chips.

Once the sum image chip $\hat{C}_{sum}$ is computed, the motion path evaluator component 212 computes a z-score for pixels of the sum image chip according to the following equation:

$$Z_{map}(i, j) = \frac{\hat{C}_{sum}(i, j) - \mu_c}{\sigma_c} \quad \text{Eq. 19}$$

where $\mu_c$ is the mean pixel value defined by:

$$\mu_c = \frac{1}{K} \sum_{k=1}^{K} \hat{C}_{sum}(k) \quad \text{Eq. 20}$$

and $\sigma_c$ is the standard deviation among pixel values defined by:

$$\sigma_c = \sqrt{\frac{1}{K} \sum_{k=1}^{K} \left(\hat{C}_{sum} - \mu_c\right)^2} \quad \text{Eq. 21}$$

where k is a pixel index. The z-score of a pixel of the sum image chip is a measure of standard deviations of the value of the pixel in the sum image chip above the mean value of pixels in the sum image chip. Signal energy of an object that moves along a candidate motion path is expected to be present at the center of image chips drawn from predicted positions of the object if the predicted positions are correct. Therefore, the z-score of the center pixel of the sum image chip is generally expected to exceed the z-score of other pixels in the sum image chip. In exemplary embodiments, after computing the z-score for the sum image chip, the motion path evaluator component 212 applies a threshold to the z-score value of the center pixel.

It is to be understood that the sum image chip can instead be represented by a continuous intensity distribution in x-y coordinate space, defined by the sum of continuous intensity distributions of the individual image chips. In such embodiments, the z-score of a position (x,y) in the sum image chip can be computed in similar fashion to Eq. 19 substituting values of $\mu_c$ and $\sigma_c$ that are computed based upon the continuous intensity distribution of the sum image chip.

If the z-score value of the center pixel of the sum image chip (or value at the center of a continuous intensity distribution defined over the sum image chip) exceeds the threshold, the motion path evaluator component 212 outputs an indication that the low SNR target pixel from which the candidate motion path originates is representative of a moving object in the scene depicted by the image frames. In a non-limiting example, and referring again to FIG. 1, the object recognition component 118 can highlight, circle, or otherwise differentiate the low SNR target pixel in one of the image frames 126 displayed on the display 115 of the computing device 104. The motion path evaluator component 212 can further output the candidate motion path with an indication that the candidate motion path is representative of actual motion of an object in the scene over the time period spanned by the image frames. In such embodiments, the candidate motion path comprises positions of the object in sub-pixel x-y coordinate space and corresponding times for which the object was at the positions. In further embodiments, the object recognition component 118 can cause an indication of the candidate motion path to be overlaid on the image frame 126 on the display 115.

If the z-score value of the center pixel does not exceed the threshold, then, as is described in greater detail below, the motion path creator component 210 can generate one or more additional candidate motion paths for the low SNR target pixel. These additional candidate motion paths can then be evaluated by the motion path evaluator component 212 as described above A value of the threshold can be set based upon a desired balance between false positive and false negative outputs of the low SNR object recognition component 200.

A size of image chips extracted from the image frames output by the frame buffer 208 can be varied according to an application for which the object recognition component 200 is used. The image chips should generally be large enough that the entirety of an object that is desirably detected can be represented in a single image chip. In exemplary embodiments, the image chips can be 15 pixels by 15 pixels or larger, 35 pixels by 35 pixels or larger, or 125 pixels by 125 pixels or larger. The image chips can be selected to have the same length as width. Furthermore, the image chips can be selected to have odd-valued dimensions (e.g., 3×3, 9×9, 15×15) so that the image chips have a single center pixel.

Various operations performed by the motion path evaluator component 212 can be performed in parallel by a GPU or other parallel processing device. By way of example, and not limitation, the motion path evaluator component 212 can cause the processor 112 to identify image chips, generate sum image chips, and compute z-scores for a plurality of candidate motion paths in parallel, simultaneously.

As described previously, the motion path creator component 210 and the motion path evaluator component 212 do not have information, a priori, as to which pixels in image frames are representative of which objects. Thus, with reference once again to FIG. 4, even after the motion path creator component 210 identifies pixels 312, 316, 320, and 324 as being low SNR target pixels, it is not certain that such pixels will be representative of a same object. Accordingly, the motion path creator component 210 can generate a plurality of motion paths 402-406, with respect to the low SNR target pixel 312. The motion path creator component 210 outputs each of the candidate motion paths 402-406 to the motion path evaluator component 212. The motion path evaluator component 212 can then determine, based upon its evaluation of the candidate motion paths 402-406 which, if any, of the paths 402-406 is actually representative of motion of an object in the scene.

The motion path creator component 210 and the motion path evaluator component 212 can perform these operations iteratively. For example, the motion path creator component 210 can initially generate the candidate motion path 404 and output the candidate motion path 404 to the motion path evaluator component 212. The motion path evaluator component 212 can determine that the candidate motion path 404 is not representative of motion of an object in the scene depicted in the image frames 302-308. The motion path creator component 210 can then create an additional motion path (e.g., the candidate motion path 402) that is output to the motion path evaluator component 212 for evaluation. The motion path creator component 210 can create the additional motion path based upon the evaluation of a previous motion by the motion path evaluator component 212. By way of example, and not limitation, for a first motion path the motion path evaluator component 212 can determine that a pixel other than the center pixel of the sum image chip exceeds a z-score threshold for the sum image chip. In the example, the motion path creator component 210 can create a second motion path that is offset from the first motion path. In another example, if no pixels in the sum image chip exceed the z-score threshold, the motion path creator component 210 can create a second motion path that extends in a different direction or that has a different velocity than the first motion path. Accordingly, it is to be understood that assumptions employed by the motion path creator component 210 to generate predicted positions of an object along a candidate motion path can be iteratively refined in response to motion path evaluations performed by the motion path evaluator component 212.

An iterative process of generating and evaluating candidate motion paths can be repeated substantially any number of times until a candidate motion path is determined by the motion path evaluator component 212 to be actually representative of motion of an object in the scene. In other embodiments, the motion path creator component 210 can be configured to generate up to a threshold number of candidate motion paths with respect to a single low SNR target pixel. If none of these candidate motion paths is determined by the motion path evaluator component 212 to be representative of motion of an object in the scene, the low SNR object recognition component 124 can output an indication that the low SNR target pixel is not representative of an object in the scene (e.g., because the value of the pixel is instead due to random noise).

In some embodiments, the motion path evaluator component 212 can perform conflict resolution among candidate motion paths that are identified by the motion path evaluator component 212 as meeting criteria for being considered actual motion paths of objects in a scene (e.g., a center pixel of a sum image chip exceeding a z-score threshold). In a non-limiting example, the motion path creator component 210 can create a first candidate motion path and a second candidate motion path that are each representative of possible motion of a same low SNR target pixel. In the example, the motion path evaluator component 212 determines that the center pixel z-score of a sum image chip that is based upon the first candidate motion path exceeds a z-score threshold value. In embodiments wherein the motion path evaluator component 212 evaluates the first candidate motion path and the second candidate motion path in parallel, the motion path evaluator component 212 can also determine that the center pixel z-score of a sum image chip exceeds the z-score threshold value. In such cases, the motion path evaluator component 212 can use various criteria to perform conflict resolution and select only one of the first candidate motion path or the second candidate motion path to output as an actual motion path of an object represented by the low SNR target pixel. By way of example, and not limitation, the motion path evaluator 212 can select the candidate motion path with the greater sum image chip center pixel z-score value, the greater sum image chip center pixel value, or the greater low SNR target pixel value.

In various embodiments, the object recognition component 118 outputs positions of identified objects in the image frames generated by either of the imaging components 110, 116 to the motion tracking component 120. The object recognition component 118 can output positions of objects to the motion tracking component 120 based upon outputs of both the high SNR object recognition component 122 and the low SNR object recognition component 124. In a non-limiting example, the high SNR object recognition component 122 and the low SNR object recognition component 124 each output locations of pixels of an image frame that are determined to be representative of objects in the image frame. The object recognition component 118 can then perform pixel clustering to identify centroids of objects in the image frame based upon the pixel locations output by the high SNR object recognition component 122 and the low SNR object recognition component 124. By way of example, the object recognition component 118 can generate an object centroid by performing a center of mass computation over connected pixels that are indicated as being representative of objects in an image frame. The object recognition component 118 outputs identified centroids to the motion tracking component 120.

The motion tracking component 120 can be configured to track the objects through subsequent image frames generated by the imaging components 110, 116 based upon the centroid locations output by the object recognition component 118. In exemplary embodiments, the motion tracking component 120 tracks objects based upon state and state transition vectors that model movement of the objects. In such embodiments, the motion tracking component 120 can provide such state vectors to the object recognition component 118 for use by the low SNR object recognition component 124 in generating candidate motion paths for objects depicted in the subsequent image frames. The motion tracking component 120 and the low SNR object recognition component 124 can therefore supplement one another's operations in connection with identifying motion of objects in images generated by the imaging components 110, 116.

Figure 6:
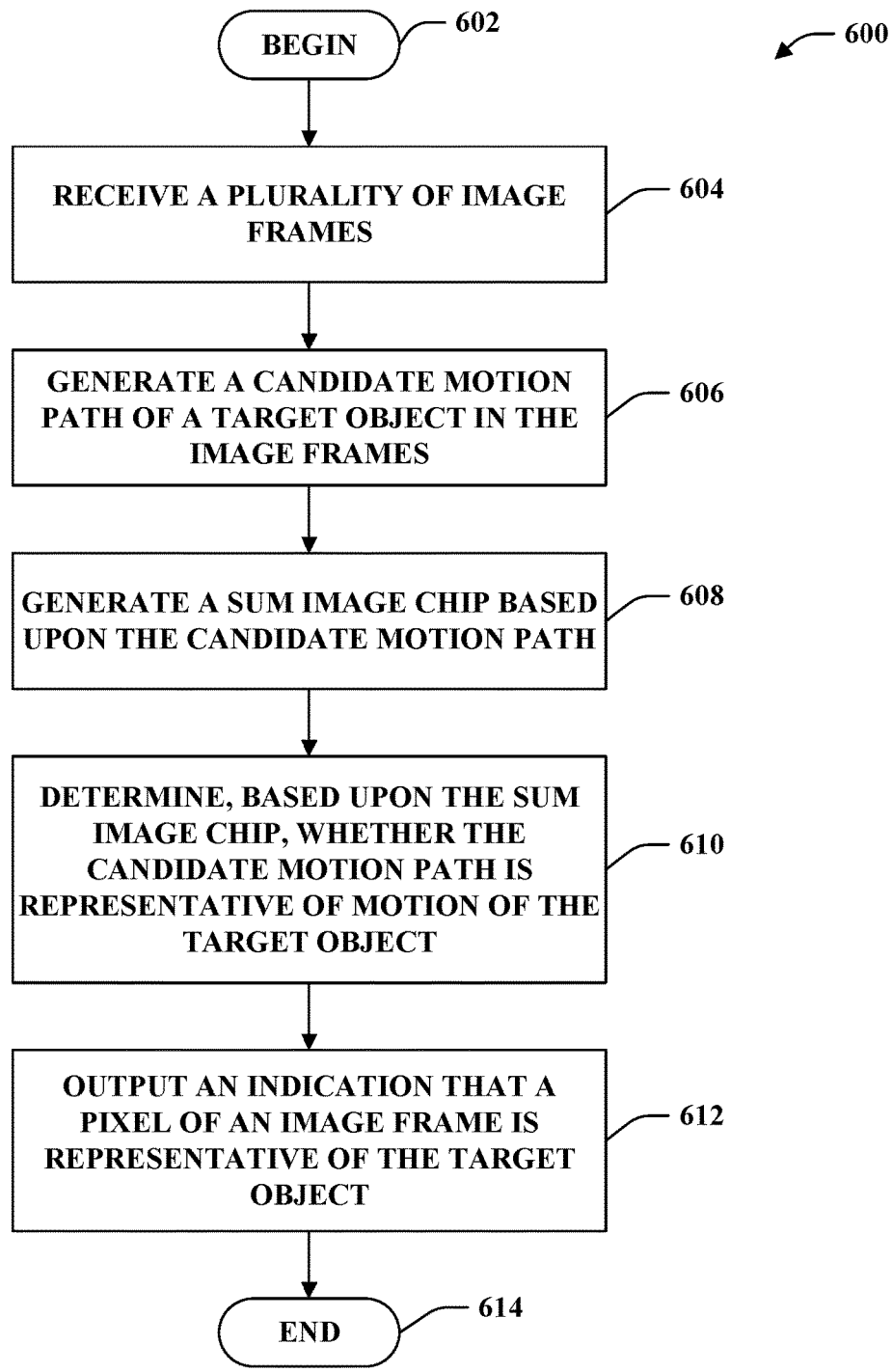
FIG. 6 is a flow diagram that illustrates an exemplary methodology for identifying objects in a plurality of image frames.

FIG. 6 illustrates an exemplary methodology relating to identification of objects represented with low SNR in multiple frames of remote sensing imagery. While the methodology is shown and described as being a series of acts that are performed in a sequence, it is to be understood and appreciated that the methodology is not limited by the order of the sequence. For example, some acts can occur in a different order than what is described herein. In addition, an act can occur concurrently with another act. Further, in some instances, not all acts may be required to implement a methodology described herein.

Moreover, the acts described herein may be computer-executable instructions that can be implemented by one or more processors and/or stored on a computer-readable medium or media. The computer-executable instructions can include a routine, a sub-routine, programs, a thread of execution, and/or the like. Still further, results of acts of the methodology can be stored in a computer-readable medium, displayed on a display device, and/or the like.

Referring now to FIG. 6, a methodology 600 that facilitates identifying moving objects represented in remote sensing image data is illustrated. The methodology 600 begins at 602, and at 604 a plurality of image frames are received. The image frames are images that are based upon remote sensing data that is representative of a scene in an observational environment of a remote sensing platform. The image frames comprise pixels, at least some of which have values that are representative of objects present in the scene. At 606, responsive to receiving an indication that a first pixel in a first image frame potentially represents a target object, a candidate motion path of the target object is generated. The candidate motion path of the target object extends across the image frames. In other words, the candidate motion path of the target object indicates a first location in the scene at a first time corresponding to a time of collection of the first image frame, and further indicates a second location in the scene at a second time corresponding to a time of collection of the second image frame.

At 608, a sum image chip is generated based upon the candidate motion path. In an exemplary embodiment, the sum image chip is generated by summing a plurality of image chips, each of which is a portion of a different respective image frame in the frames received at 604. The image chips can be image chips that are centered about different points along the candidate motion path. At 610, it is determined whether the candidate motion path is representative of motion of the target object based upon the sum image chip. By way of example, and not limitation, the candidate motion path can be determined to be representative of motion of the target object based upon a z-score value of a center pixel of the sum image chip exceeding a threshold z-score value. At 612, in response to determining that the candidate motion path is representative of motion of the target object, an indication that a pixel of one of the image frames is representative of the target object is output, where the pixel is a pixel that is crossed by the candidate motion path. For example, the image frame can be presented on a display of a computing device, and the pixel highlighted or otherwise distinguished from other pixels in the image frame that do not lie along the candidate motion path. At 614, the methodology 600 ends.

Figure 7:
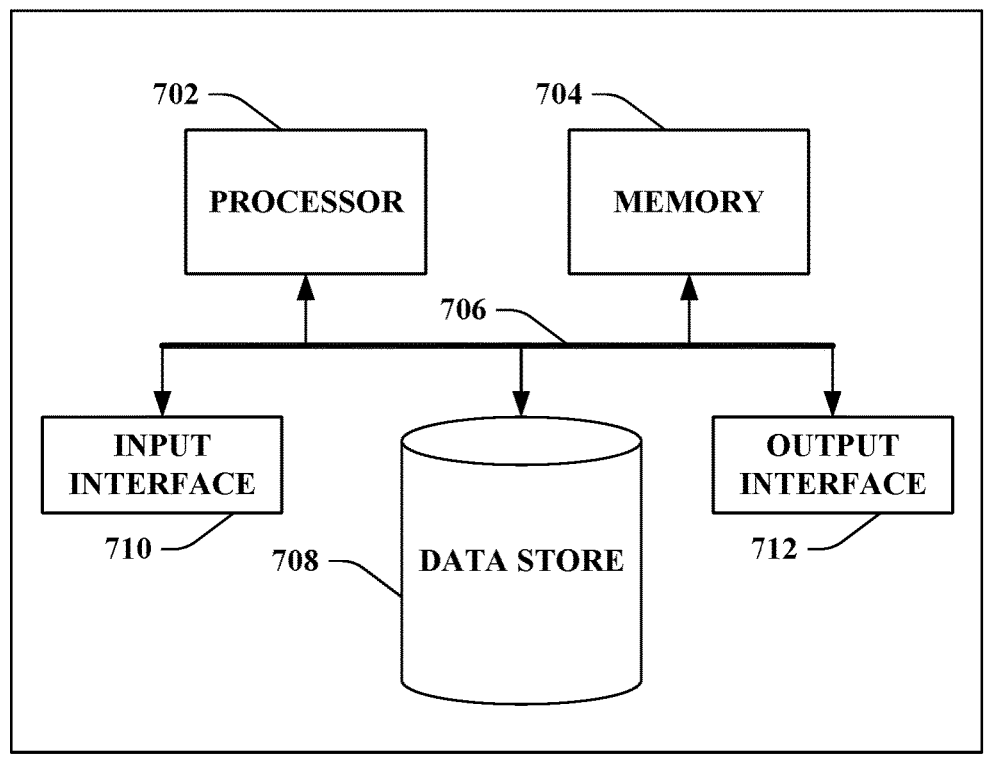
FIG. 7 is an exemplary computing system.

Referring now to FIG. 7, a high-level illustration of an exemplary computing device 700 that can be used in accordance with the systems and methodologies disclosed herein is illustrated. For instance, the computing device 700 may be used in a system that generates images based upon signals output by a remote sensing device. By way of another example, the computing device 700 can be used in a system that identifies objects and object motion paths in multiple frames of remote sensing images. The computing device 700 includes at least one processor 702 that executes instructions that are stored in a memory 704. The instructions may be, for instance, instructions for implementing functionality described as being carried out by one or more components discussed above or instructions for implementing one or more of the methods described above. The processor 702 may access the memory 704 by way of a system bus 706. In addition to storing executable instructions, the memory 704 may also store image frames, computation results, image chips, object state vectors, detected object locations or motion paths in image frames, etc.

The computing device 700 additionally includes a data store 708 that is accessible by the processor 702 by way of the system bus 706. The data store 708 may include executable instructions, images, etc. The computing device 700 also includes an input interface 710 that allows external devices to communicate with the computing device 700. For instance, the input interface 710 may be used to receive instructions from an external computer device, from a user, etc. The computing device 700 also includes an output interface 712 that interfaces the computing device 700 with one or more external devices. For example, the computing device 700 may display text, images, etc., by way of the output interface 712.

It is contemplated that the external devices that communicate with the computing device 700 via the input interface 710 and the output interface 712 can be included in an environment that provides substantially any type of user interface with which a user can interact. Examples of user interface types include graphical user interfaces, natural user interfaces, and so forth. For instance, a graphical user interface may accept input from a user employing input device(s) such as a keyboard, mouse, remote control, or the like and provide output on an output device such as a display. Further, a natural user interface may enable a user to interact with the computing device 700 in a manner free from constraints imposed by input device such as keyboards, mice, remote controls, and the like. Rather, a natural user interface can rely on speech recognition, touch and stylus recognition, gesture recognition both on screen and adjacent to the screen, air gestures, head and eye tracking, voice and speech, vision, touch, gestures, machine intelligence, and so forth.

Additionally, while illustrated as a single system, it is to be understood that the computing device 700 may be a distributed system. Thus, for instance, several devices may be in communication by way of a network connection and may collectively perform tasks described as being performed by the computing device 700.

Various functions described herein can be implemented in hardware, software, or any combination thereof. If implemented in software, the functions can be stored on or transmitted over as one or more instructions or code on a computer-readable medium. Computer-readable media includes computer-readable storage media. A computer-readable storage media can be any available storage media that can be accessed by a computer. By way of example, and not limitation, such computer-readable storage media can comprise RAM, ROM, EEPROM, CD-ROM or other optical disk storage, magnetic disk storage or other magnetic storage devices, or any other medium that can be used to carry or store desired program code in the form of instructions or data structures and that can be accessed by a computer. Disk and disc, as used herein, include compact disc (CD), laser disc, optical disc, digital versatile disc (DVD), floppy disk, and blu-ray disc (BD), where disks usually reproduce data magnetically and discs usually reproduce data optically with lasers. Further, a propagated signal is not included within the scope of computer-readable storage media. Computer-readable media also includes communication media including any medium that facilitates transfer of a computer program from one place to another. A connection, for instance, can be a communication medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio and microwave are included in the definition of communication medium. Combinations of the above should also be included within the scope of computer-readable media.

Alternatively, or in addition, the functionality described herein can be performed, at least in part, by one or more hardware logic components. For example, and without limitation, illustrative types of hardware logic components that can be used include Field-programmable Gate Arrays (FPGAs), Application-specific Integrated Circuits (ASICs), Application-specific Standard Products (ASSPs), System-on-a-chip systems (SOCs), Complex Programmable Logic Devices (CPLDs), etc.

What has been described above includes examples of one or more embodiments. It is, of course, not possible to describe every conceivable modification and alteration of the above devices or methodologies for purposes of describing the aforementioned aspects, but one of ordinary skill in the art can recognize that many further modifications and permutations of various aspects are possible. Accordingly, the described aspects are intended to embrace all such alterations, modifications, and variations that fall within the spirit and scope of the appended claims. Furthermore, to the extent that the term "includes" is used in either the detailed description or the claims, such term is intended to be inclusive in a manner similar to the term "comprising" as "comprising" is interpreted when employed as a transitional word in a claim.

What is claimed is:

1. A system, comprising:
   a processor; and
   memory that stores instructions that, when executed by the processor, cause the processor to perform acts comprising:
      receiving a plurality of image frames that are each representative of a scene at a different time;
      identifying a first pixel of a first image frame in the image frames as being potentially representative of a target object based upon a value of the first pixel;
      generating a candidate motion path of the target object across the image frames based upon the first pixel;
      summing a plurality of image chips to generate a sum image chip, each of the image chips based upon a different frame in the frames, each of the image chips centered about a respective point on the candidate motion path;
      based upon the sum image chip, determining whether the candidate motion path is representative of motion of the target object in the scene; and
      responsive to determining that the candidate motion path is representative of motion of the target object in the scene, outputting an indication that the first pixel is representative of the target object.

2. The system of claim 1, the acts further comprising responsive to determining that the candidate motion path is representative of motion of the target object in the scene, outputting an indication of a motion track of the target object on at least one of the image frames.

3. The system of claim 1, the acts further comprising: responsive to receiving the plurality of image frames, filtering outlier pixels in the first image frame, wherein filtering outlier pixels in the first image frame comprises:
   identifying neighboring pixels of a second pixel of the first image frame;
   computing an outlier ratio of the second pixel based upon a value of the second pixel and values of a plurality of pixels included in the neighboring pixels; and
   responsive to determining that the outlier ratio exceeds a threshold value, replacing the value of the second pixel with an average of values of the neighboring pixels.

4. The system of claim 3, wherein the plurality of pixels excludes a highest-valued pixel in the neighboring pixels and further excludes a lowest-valued pixel in the neighboring pixels.

5. The system of claim 1, wherein the first image frame is representative of the scene at a first time, and wherein the first image frame is generated based upon subtracting a background estimator from a second image frame that is representative of the scene at the first time, the background estimator generated based upon a third image frame that is representative of the scene at a second time that is prior to the first time.

6. The system of claim 5, wherein the value of the first pixel is normalized based upon at least one of a spatial standard deviation of a second pixel of the third image frame or a temporal standard deviation of the second pixel of the third image frame, wherein the second pixel is at a same pixel location in the third image frame as the first pixel in the first image frame.

7. The system of claim 1, wherein the candidate motion path comprises positions of the target object defined to sub-pixel precision.

8. The system of claim 1, wherein generating the candidate motion path comprises projecting a position of the target object from a first position in the first image frame to a second position in a second image frame in the images frames based upon a state vector that is representative of motion of the target object.

9. The system of claim 8, wherein the state vector comprises an acceleration value for the target object.

10. The system of claim 9, wherein generating the candidate motion path is based upon the acceleration value being constant over a period of time that extends from a first time represented by an earliest frame in the image frames to a second time represented by a latest frame in the image frames.

11. The system of claim 1, wherein determining whether the candidate motion path is representative of motion of the target object in the scene comprises:
    computing a z-score of a center pixel of the sum image chip; and
    determining that the candidate motion path is representative of motion of the target object in the scene based upon the z-score exceeding a z-score threshold.

12. The system of claim 11, wherein computing the z-score is based upon a mean of pixel values of pixels of the sum image chip and a standard deviation of the pixel values of the pixels of the sum image chip.

13. The system of claim 1, wherein generating the candidate motion path is based upon user input, wherein the user input specifies at least two points on the image frames, and wherein the candidate motion path is generated to include the at least two points.

14. The system of claim 1, the acts further comprising identifying a second pixel of the first image frame as being representative of a second target object based upon a value of the second pixel exceeding a threshold, wherein the value of the first pixel does not exceed the threshold.

15. A method, comprising:
    receiving a plurality of image frames that are each representative of a scene at a different time, wherein the scene includes a plurality of objects, the objects represented in the image frames;
    responsive to receiving an indication that a first pixel of a first image frame in the image frames is potentially representative of a target object, generating a candidate motion path of the target object across the image frames, wherein the candidate motion path includes the first pixel;
    generating a sum image chip, wherein the sum image chip is based upon a plurality of image chips, each of the image chips consisting of a portion of a different respective image frame in the image frames, each of the image chips centered about a different respective point on the candidate motion path;
    based upon the sum image chip, determining whether the candidate motion path is representative of motion of the target object in the scene; and
    responsive to determining that the candidate motion path is representative of motion of the target object in the scene, outputting an indication that the first pixel is representative of the target object.

16. The method of claim 15, further comprising identifying that a second pixel of the first image frame is representative of an object in the scene based upon a value of the second pixel exceeding a threshold value, wherein the first pixel does not exceed the threshold value.

17. The method of claim 16, wherein the first pixel and the second pixel are adjacent, the method further comprising:
 computing a centroid based upon the first pixel and the second pixel, wherein the centroid is representative of the target object; and
 outputting the centroid to an object motion tracker, the object motion tracker configured to identify a location of the target object represented by the centroid in an image frame received subsequent to the plurality of image frames.

18. The method of claim 15, wherein the candidate motion path comprises a predicted position of the target object in a second image frame in the image frames, wherein a first image chip in the image chips is centered about the predicted position, the first image chip consisting of a portion of the second image frame.

19. A system for tracking objects in remote sensing imagery, the system comprising:
 a remote sensing device; and
 a computing device configured to perform the following acts:
  generating a plurality of at least three image frames based upon signals received from the remote sensing device over a period of time, each of the image frames being representative of a scene in a field of view of the remote sensing device at a different respective time;
  determining that a first pixel of a first image frame in the image frames is potentially representative of a target object based upon a value of the first pixel exceeding a threshold value;
  generating a candidate motion path across the image frames, wherein the candidate motion path includes the first pixel, the candidate motion path indicative of a potential position of the target object in each of the image frames;
  generating a sum image chip by adding a plurality of image chips, each of the image chips based upon a portion of a different respective image frame in the image frames, each of the image chips centered about a different respective point on the candidate motion path;
  based upon values of pixels of the sum image chip, determining whether the candidate motion path is representative of motion of the target object in the scene; and
  responsive to determining that the candidate motion path is representative of motion of the target object in the scene, outputting, to a display of the computing device, a graphical indication of the candidate motion path overlaid on at least one of the image frames.

20. The system of claim 19, wherein the remote sensing device is one of a radar imaging device, an electro-optical/infrared (EO/IR) imaging device, or a camera.

\* \* \* \* \*